No. 657,966. Patented Sept. 18, 1900.
S. H. G. STEWART.
ART OF CULTIVATING FRUITS OR VEGETABLES.
(Application filed May 1, 1900.)

(No Model.) 2 Sheets—Sheet 1.

No. 657,966. Patented Sept. 18, 1900.
S. H. G. STEWART.
ART OF CULTIVATING FRUITS OR VEGETABLES.
(Application filed May 1, 1900.)

(No Model.) 2 Sheets—Sheet 2.

Attest:
L. Lee
Walter H. Talmage.

Inventor.
Stanley H. G. Stewart, per
Thos. S. Crane, Atty.

THE NORRIS PETERS CO., PHOTO-LITHO., WASHINGTON, D. C.

UNITED STATES PATENT OFFICE.

STANLEY H. GARDYNE STEWART, OF NEW YORK, N. Y.

ART OF CULTIVATING FRUITS OR VEGETABLES.

SPECIFICATION forming part of Letters Patent No. 657,966, dated September 18, 1900.

Application filed May 1, 1900. Serial No. 15,112. (No model.)

*To all whom it may concern:*

Be it known that I, STANLEY H. GARDYNE STEWART, a citizen of the United States, residing at New York, county of New York, State of New York, (whose post-office address is No. 175 West Fifty-eighth street,) have invented certain new and useful Improvements in the Art of Cultivating Fruits or Vegetables, fully described and represented in the following specification and the accompanying drawings, forming a part of the same.

The present invention relates to an improved means for cultivating fruits and vegetables, and is especially applicable to the cultivation of oranges, to protect the crop from destruction by climatic changes, such as frosts, droughts, and floods. The desired immunity from these influences is obtained by inclosing the sides of a definite space with a tight fence of suitable height, covering the top partly with a permanent roof and partly with a temporary or removable roof, and using the means herein described to regulate the atmospheric conditions as required.

In applying the invention to large orchards I divide the same into sections of convenient size, and thus protect any required area, and combine with such inclosure pipes extended above the ground at intervals and perforated to discharge their contents into the atmosphere, and connecting with the pipes means for heating air, and also means for generating steam, so that by the manipulation of suitable valves either steam or hot air may be discharged into the pipes at pleasure and diffused throughout the inclosure.

The removable portion of the roof may be formed of canvas curtains wound upon rolls, so as to secure the proper degree of sunlight for the growing plants when desired.

The invention will be understood by reference to the annexed drawings, in which—

Figure 1:
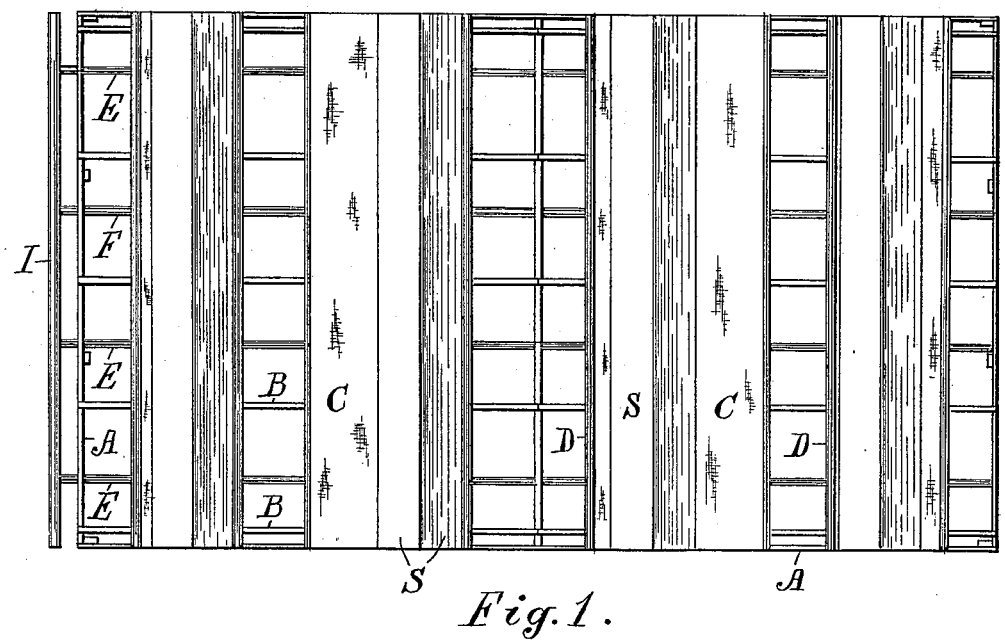
Figure 2:
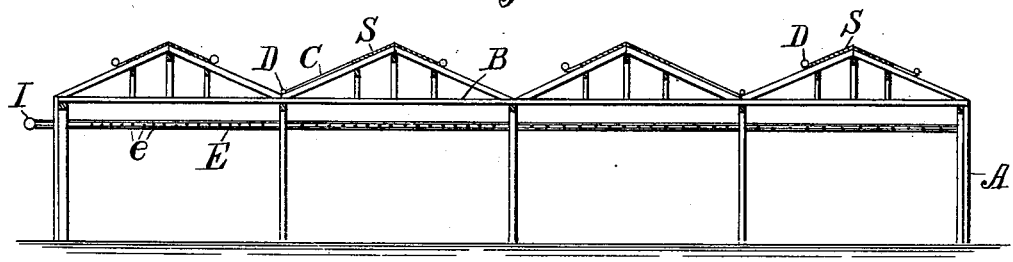
Figure 3:
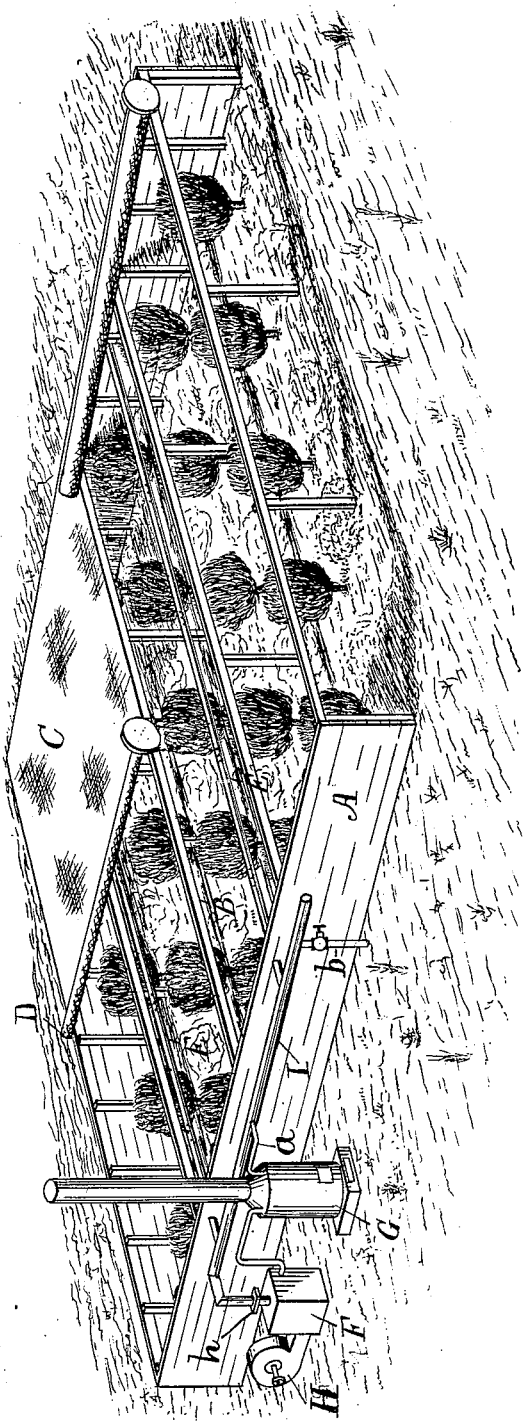

Figure 1 is a plan of a plot of ground inclosed by a fence and covered by four roof-sections. Fig. 2 is a longitudinal section of the same, and Fig. 3 is a perspective view of an orchard upon a plot of ground inclosed by a fence and the roof formed of movable curtains.

The perspective view shows the apparatus for supplying steam, hot air, and water, and the fence is omitted from the nearer side of the plot to expose the interior to view.

A designates the fence around the plot of ground, and B beams extended at intervals across the same to support the roof-covering.

In Figs. 1 and 2, S represents the portions of the roof formed of sheds, and C the curtains, actuated by rolls D. Pipes E are shown extended at intervals across the plot, with perforations *e* to discharge the fluids therefrom.

I designates a header-pipe connected with the pipes E and adapted to receive connections for supplying air or steam or water to the pipes E. Only the parts just described are shown in Figs. 1 and 2; but Fig. 3 also shows the connections for supplying the pipes.

F designates an air-heating box, which is provided with means to heat the air. A steam-boiler G is shown to supply steam to such air-heating box or directly to the pipes E, and H designates a blower propelled by any suitable power to force air when desired through the air-heating box and discharge it in a heated condition to the pipe E. The air may be heated by contact with a steam-coil and the coil treated by any ordinary and well-known means. A gate *h* is shown upon the top of the air-heating box, which is closed when steam or water is admitted to the header. A pipe *a* is shown connecting the boiler directly with the header I to supply the pipes E with steam when required, and a water-service pipe *b* is shown extended from the ground to the header I to supply the pipes E with water. The pipes E and their connections thus furnish the means of modifying the condition of the atmosphere in any desired manner and degree in the inclosed space. The water-supply to the pipes E avoids the use of other irrigating appliances when desired.

The curtains C furnish means for inclosing the space in whole or in part whenever required, and thus prevent an excess or deficiency of heat, moisture, or other atmospheric elements. When the temperature falls below a desirable point, I close the roof-covering and introduce heated air into the inclosed space, thus maintaining the temperature at a safe point. Steam may be introduced at other times through the same pipes to control the moisture of the atmosphere, the steam being diffused within the space and condensed upon the leaves of the plants, thus imbuing the atmosphere and supplying the plants directly with the degree of moisture that is found most advantageous.

My improvements are especially adapted to the cultivation of orange-trees and secure a crop of very superior character independent of the climatic conditions.

It has been found desirable in the cultivation of oranges to sprinkle the leaves of the trees with water at certain portions of the season; but such sprinkling is very tedious and expensive if effected by spraying, and the steam may be employed to produce the desired moisture upon the leaves by condensation and to effect such result with great economy and expedition, as the steam is so readily diffused in the atmosphere.

Having thus set forth the nature of the invention, what is claimed herein is—

In the cultivation of fruits and vegetables, the combination, with a fence inclosing the sides of a section of ground under cultivation, of a covering to inclose the same at pleasure, pipes extended above the ground at intervals and perforated to discharge their contents into the atmosphere, means for heating air and supplying the same to the pipes, and means for boiling water and discharging the steam to the pipes, and suitable valves for directing the hot air or steam at pleasure into the pipes, whereby the hot air or steam may be diffused throughout the inclosure, as may be required.

In testimony whereof I have hereunto set my hand in the presence of two subscribing witnesses.

STANLEY H. GARDYNE STEWART.

Witnesses:
A. W. CHISHOLM,
L. C. CHISHOLM.